Patented Dec. 21, 1926.

1,611,190

UNITED STATES PATENT OFFICE.

MAX HARTMANN AND HANS KÄGI, OF BASEL, SWITZERLAND, ASSIGNORS TO SOCIETY OF CHEMICAL INDUSTRY IN BASLE, OF BASEL, SWITZERLAND.

EMULSION OF MEDICAMENTS SOLUBLE IN OIL AND PROCESS FOR THE MANUFACTURE OF THE SAME.

No Drawing. Application filed March 30, 1923, Serial No. 628,906, and in Germany May 8, 1922.

According to this invention emulsions, durable for a long time, of medicaments soluble in oil can be made when an oil is used which by partial halogenization has been brought to a specific gravity substantially equal to that of the emulsifying liquid. In this manner the separation of the constituents of the emulsion is avoided or very much delayed and the small particles produced by the emulsification remain freely suspended in the liquid.

For example, in order to make a durable emulsion of camphor, olive oil may be brominated until its specific gravity has become 1, for which purpose 100 parts of oil require about 15 parts of bromine. With aid of this oil there may be obtained a solution of camphor which can be emulsified with a dilute aqueous solution of gum arabic or sodium caseinate or some other emulsifying agent. Chlorine may be used instead of bromine, in which case about 25 parts of chlorine are required to convert 100 parts of olive oil into a liquid of specific gravity 1.

Any other medicament soluble in oil may be treated in the manner described for camphor, for instance guaiacol and its esters, eucalyptol, benzylacetate, ethyl-salicylate.

The following examples illustrate the invention:—

Example 1.

The bromine is dropped into olive oil kept cool until a test portion shows a specific gravity of 1.02. In this brominated oil 20 per cent of its weight of camphor is dissolved and 1 part by weight of this solution of camphor is emulsified with 1 part of dilute gum solution.

Example 2.

Chlorine is introduced into cooled olive oil, until the oil has obtained a specific gravity of 1.00–1.02. This chlorinated oil is used to dissolve 20 per cent of its weight of camphor and the solution is emulsified with an equal weight of a dilute solution of sodium caseinate.

Example 3.

10 parts by weight of eucalyptus oil are dissolved in 100 parts by weight of brominated olive oil having a specific gravity of 1.02, and the solution is emulsified with 100 parts by weight of a dilute solution of sodium caseinate.

What we claim is:

1. A process for the manufacture of stable oil-in-water emulsions of medicaments soluble in oils, by mixing a medicament which is soluble in oils, with a halogenized oil so that there is obtained a solution of the same specific gravity as that of the aqueous phase and then mixing together the oily and the aqueous phases.

2. A process for the manufacture of stable oil-in-water emulsions of medicaments soluble in oils, by mixing a medicament which is soluble in oils with a halogenized olive-oil so that there is obtained a solution of the same specific gravity as that of the aqueous phase and then mixing together the oily and the aqueous phases.

3. A process for the manufacture of stable oil-in-water emulsions of medicaments soluble in oils, by mixing a medicament which is soluble in oils with a brominated olive-oil so that there is obtained a solution of the same specific gravity as that of the aqueous phase and then mixing together the oily and the aqueous phases.

4. A process for the manufacture of stable oil-in-water emulsions of medicaments soluble in oils, by mixing camphor with a halogenized oil, so that there is obtained a solution of the same specific gravity as that of the aqueous phase and then mixing together the oily and the aqueous phases.

5. A process for the manufacture of stable oil-in-water emulsions of camphor by mixing camphor with a halogenized olive-oil, so that there is obtained a solution of the same specific gravity as that of the aqueous phase and then mixing together the oily and the aqueous phases.

6. A process for the manufacture of stable oil-in-water emulsions of camphor by mixing camphor with brominated olive-oil, so that there is obtained a solution of the same specific gravity as that of the aqueous phase and then mixing together the oily and the aqueous phases.

7. In the manufacture of emulsions of medicaments soluble in oil, the operation of mixing with an emulsifying liquid an oil which has been halogenized until its specific gravity is substantially identical with that of the emulsifying liquid.

8. As new articles of manufacture the herein described emulsions of halogenated oils in usual emulsifying agents, wherein the oily phase is of the same specific gravity as the aqueous phase.

9. As new articles of manufacture the herein described emulsions of medicaments soluble in oils, constituting mixtures of solutions of said medicaments in halogenized oils with usual emulsifying agents wherein the oily and the aqueous phases are of the same specific gravity.

10. As new articles of manufacture the herein described emulsions of medicaments soluble in oils, constituting mixtures of solutions of said medicaments in halogenized olive oil with usual emulsifying agents wherein the oily and the aqueous phases are of the same specific gravity.

11. As new articles of manufacture the herein described emulsions of medicaments soluble in oils, constituting mixtures of solutions of said medicaments in brominated olive oil with usual emulsifying agents wherein the oily and the aqueous phases are of the same specific gravity.

12. As a new article of manufacture an emulsion of camphor, constituting a mixture of a solution of camphor in halogenized olive oil with usual emulsifying agents wherein the oily and the aqueous phases are of the same specific gravity.

13. As a new article of manufacture an emulsion of camphor, constituting a mixture of a solution of camphor in brominated olive oil with usual emulsifying agents wherein the oily and the aqueous phases are of the same specific gravity.

14. As a new article of manufacture an emulsion of camphor, constituting a mixture of a solution of camphor in brominated olive oil with an aqueous solution of sodium caseinate wherein the oily and the aqueous phases are of the same specific gravity.

In witness whereof we have hereunto signed our names this 12th day of March 1923.

MAX HARTMANN.
HANS KÄGI.